United States Patent [19]

Anzai et al.

[11] Patent Number: 4,713,550

[45] Date of Patent: Dec. 15, 1987

[54] DOCUMENT SIZE DETECTION APPARATUS

[75] Inventors: Shunju Anzai, Nara; Hiromu Sasaki, Yamatokoriyama; Norihide Kunikawa, Yao; Kazuyuki Ohgita, Nara, all of Japan

[73] Assignee: Sharp Kabushiki Kaisha, Osaka, Japan

[21] Appl. No.: 916,725

[22] Filed: Oct. 8, 1986

[30] Foreign Application Priority Data

Oct. 8, 1985 [JP] Japan .................. 60-225047

[51] Int. Cl.$^4$ ............................. G03G 15/00
[52] U.S. Cl. ................. 250/560; 355/14 SH; 355/3 SH; 355/75
[58] Field of Search .......... 355/14 SH, 3 SH, 41, 355/3 R, 75; 250/560, 556, 206

[56] References Cited

U.S. PATENT DOCUMENTS

| | | | |
|---|---|---|---|
| 4,338,020 | 7/1982 | Yukawa et al. | 355/14 SH |
| 4,341,460 | 7/1982 | Kohyama | 355/14 SH |
| 4,456,372 | 6/1984 | Yamauchi | 355/14 SH |
| 4,505,574 | 3/1985 | Kurata et al. | 250/560 |
| 4,511,246 | 4/1985 | Nishiyama | 355/14 SH |
| 4,568,181 | 2/1986 | Nishiyama | 355/14 SH |
| 4,572,650 | 2/1986 | Okuda | 250/560 |
| 4,585,332 | 4/1986 | Shenoy | 355/14 SH |
| 4,614,874 | 9/1986 | Fukuda et al. | 250/560 |

*Primary Examiner*—R. L. Moses
*Attorney, Agent, or Firm*—Birch, Stewart, Kolasch & Birch

[57] ABSTRACT

A document size detection apparatus having a plurality of sensor portions including light emitting devices and photodetector devices disposed in the vicinity of an original table for detecting the size of a document such as an original mounted on the original table is disclosed. This apparatus uses reflected light or transmitted light, a comparator for comparing the output level of the sensor portion with a reference level, and decision means for deciding the document size depending on the output signal of the comparator. The document size detection apparatus comprises a circuit for changing the reference level of the comparator and for detecting the resultant output of the comparator in order to find the condition in which the reference level becomes equal to the output level of the sensor portion and a storage circuit for storing the value representing that condition, which are used in the adjustment mode without a document mounted on the original table, and a reference level setting circuit for setting the reference level to be input to the comparator depending on the value stored in the storage circuit, which is used in the document size decision mode for detecting the size of a document mounted on the table.

4 Claims, 11 Drawing Figures

DOCUMENT SIZE DETECTION APPARATUS

BACKGROUND OF THE INVENTION

The present invention relates to an improvement in a detection apparatus for detecting sizes of documents such as originals by means of a plurality of optical sensors which utilize reflected or transmitted light.

In duplicating an original with an electrophotographic copying machine or the like, it is usually the case to detect the size of the original mounted on the original table and to automatically select the copying paper having a size corresponding to the detected size.

The original size detection apparatus is structured such that light emitting devices and photodetector devices are arranged to receive light reflected from the original document or light transmitted therethrough and to thereafter determine the size of the original based on the conditions detected by the photodetector devices.

In the document size detection apparatus, the signal level of the detection signal have to be manually adjusted depending on the quantity of light from the light emitting devices, characteristics of the output level of the photodetector devices, characteristics of the circuits using these devices, etc. Much labor is required for making such adjustments. Besides, there is the need for readjustments during the use of the apparatus as the document table becomes dirty, the optical system including the light emitting devices and photodetector devices become dirty, or changes in the circuit characteristics occur.

SUMMARY OF THE INVENTION

A primary object of the present invention is to provide a document size detection apparatus which will eliminate the need for the above-mentioned manual adjustment of the signal level, and which is capable of automatically making the adjustment when needed.

In brief, in a document size detection apparatus having a plurality of sensor portions including light emitting devices and photodetector devices disposed in the vicinity of an original table for detecting the size of a document such as an original mounted on the original table by means of reflected light or transmitted light, a comparator for comparing the output level of the sensor portion with a reference level, and decision means for deciding the document size depending on the output signal of the comparator, the present invention is characterized in that the same comprises a circuit changing the reference level for the comparator and detecting the resultant output of the comparator for finding the condition in which the reference level becomes equal to the output level of the sensor portion and a storage circuit for storing the value representing that condition, which are used in the adjustment mode without a document mounted on the original table, and a reference level setting circuit for setting the reference level to be input to the comparator depending on the value stored in the storage circuit, which is used in the document size decision mode for detecting the size of a document mounted on the table.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from thhis detailed description.

BRIEF DESCRIPTION OF THE DRAWINGS

The present invention will become more fully understood from the detailed description given hereinafter and the accompanying drawings which are given by way of illustration only, and thus are not limitative of the present invention and wherein.

DESCRIPTION OF THE PREFERRED EMBODIMENTS

Figure 1:
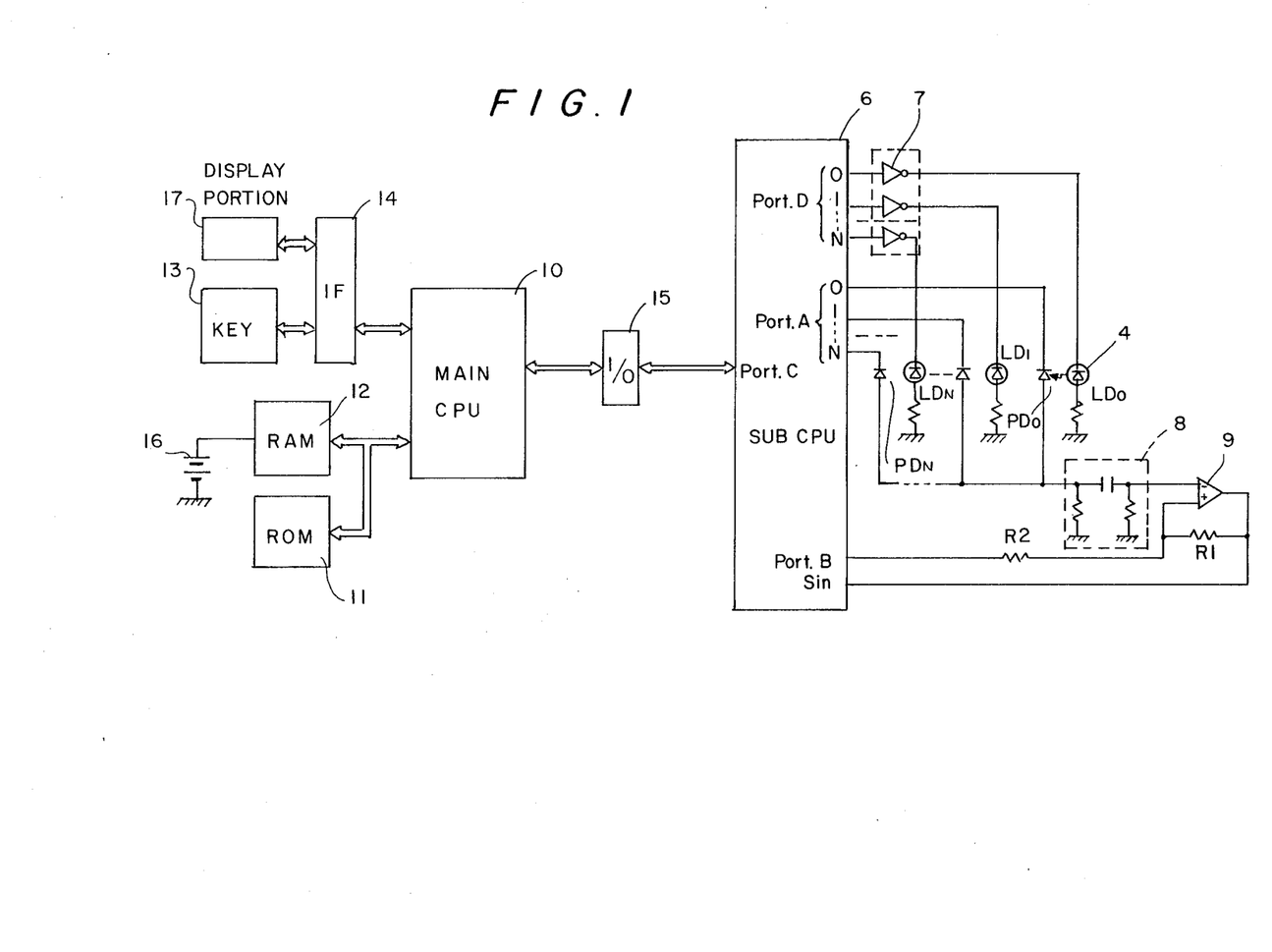
FIG. 1 is a block diagram showing a circuit of a document size detection apparatus as an embodiment of the present invention.

Referring in detail to the drawings and with particular reference to FIG. 1, a diagram showing a circuit configuration for original size detection to which the present invention is applied is shown. Referring to the drawing, $LD_0$, $LD_1$, . . . , $LD_N$ denote light emitting diodes and $PD_0$, $PD_1$, . . . , $PD_N$ denote photodiodes. The light emitting diode $LD_0$ and photodiode $PD_0$ form a pair and are provided specifically for detecting an opened or closed state of the original cover for pressing down the original. The light emitting diodes $LD_1$–$LD_N$ and photodiodes $PD_1$ to $PD_N$ are arranged corresponding to the sizes of the originals to be placed in specified positions and are used for detecting the original size.

(a) Arrangements of Light Emitting and Photodetector Devices

Figure 2:
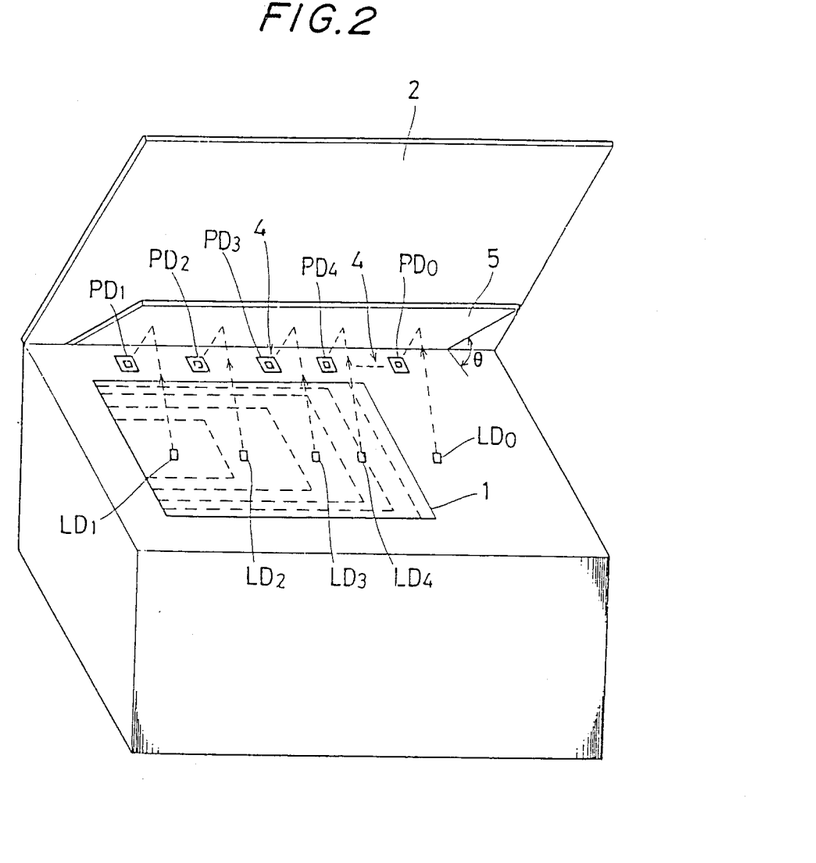
FIG. 2 is a drawing exemplifying an arrangement of sensors for detecting the original size in a copying machine to which the present invention is applied.
Figure 3:
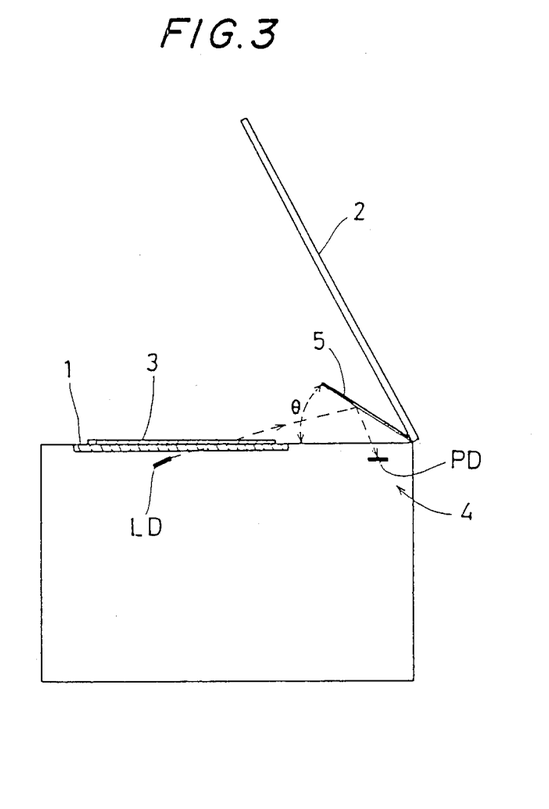
FIG. 3 is a sectional view of FIG. 2.

An example of arranged positions of the light emitting diodes LD and the photodiodes PD is shown in FIGS. 2 and 3. Referring to the drawings, 1 denotes an original table made of a transparent glass plate and disposed at the top of the copying machine body, 2 denotes an original cover, 3 denotes an original to be mounted on the original table 1 in a specified position, and 4 denotes sensors disposed corresponding to the sizes of the originals for detecting presence or absence of the original. Each sensor 4 is formed of a light emitting diode LD and a photodiode PD.

The original cover 2 is provided with a reflecting plate 5 which is movable as the cover is opened and closed. The reflecting plate serves to reflect light from the light emitting diode LD of the sensor and is arranged as a separate body from the original cover 2. This plate 5 is sized such that it will not overlap the original table 1. Though the reflecting plate 5 is opened or closed as the original cover 2 is opened or closed, it is adapted such that the reflecting plate 5 is opened only as far as its opening angle becomes $\theta$. This reflecting plate 5 same is held at the angle $\theta$ even if the original cover 2 is opened still wider. As the original cover 2 is closed the reflecting plate will remain at angle until the original cover 2 reaches this position. Thereafter, the plate 5 will rotate with the movement of the original cover 2.

With reference to the reflecting plate 5 arranged as described above, each of the sensors 4 is disposed such that light from the light emitting diode LD is reflected by the reflecting plate 5 while the reflecting plate 5 is opened and the photodiode PD receives the reflected light. As shown in FIG. 2, the light emitting diode $LD_0$ is for detecting whether the original cover 2 is opened or closed and the same is disposed on the original table 1 off the position where the originals are to be mounted, and the photodiode $PD_0$ is disposed in the position corresponding thereto. The light emitting diode $LD_1$ is for detecting a B5 sized original on the original table 1, the light emitting diode $LD_2$ is for detecting an A4 sized original, the light emitting diode $LD_3$ is for detecting a B4 sized original, and the light emitting diode $LD_4$ is for detecting an A3 sized original. Each diode is disposed in their respective places as seen in FIG. 2.

(b) Circuit

The sensors 4 are arranged as shown in FIG. 1 so that the light emitting diodes LD and the photodiodes PD are connected to a sub CPU 6 constituted of a microprocessor. Each of the cathode terminals of the light emitting diodes $LD_0$–$LD_N$ are connected through inverters 7 to each of output terminals D (hereinafter to be sometimes referred to as the Port) of the sub CPU 6 and the anode terminals are grounded through resistors. Each of the cathode terminals of the photodiodes $PD_0$–$PD_N$ are connected to the respective terminals of the Port A of the sub CPU 6. The anode terminals of the photodiodes $PD_0$–$PD_N$ are joined together and connected through a filter circuit 8 to the inverting input terminal of a comparator 9. The noninverting input terminal of the comparator 9 is connected through a resistor R2 to the Port B of the sub CPU 6. The port B is a terminal capable of delivering 128 steps of output voltages as analog signals as described later. The output terminal of the comparator 9 is connected to a Sin terminal of the sub CPU 6, and the sub CPU is enabled to read the state of the Sin terminal and thereby to detect result of comparison made by the comparator. Incidentally, resistors R1 and R2 are provided for setting the gain of the comparator 9.

The sub CPU 6 drives the light emitting diodes $LD_0$–$LD_N$ in a time-sharing manner and reads the output states of the comparator 9 changing with the output levels of the photodiodes $PD_0$–$PD_N$ as the photodetector devices corresponding to the light emitting diodes being driven.

The main CPU 10 is the control portion controlling the entire copying machine and processing operations according to a control program previously stored in a ROM 11. A RAM 12 is a memory to be used as a working area when the mentioned program is executed, and the contents in its storage are backed up by a battery 16 if the power source in another block is cut off. Reference numeral 13 denotes a key entry device and includes an adjustment key for specifying the adjustment mode. In a display portion 17, there is provided a symbol display member for indicating that the adjustment mode is now specified. Reference numeral 14 denotes an interface circuit between the key entry device plus the display portion and the main CPU. Reference numeral 15 denotes an I/O circuit for the main CPU 10, and the same serves to output control codes to the input terminal C of the sub CPU 6 and to read data representing the document size, control codes, and others from the sub CPU 6.

(c) Operational Sequence

Figure 4:
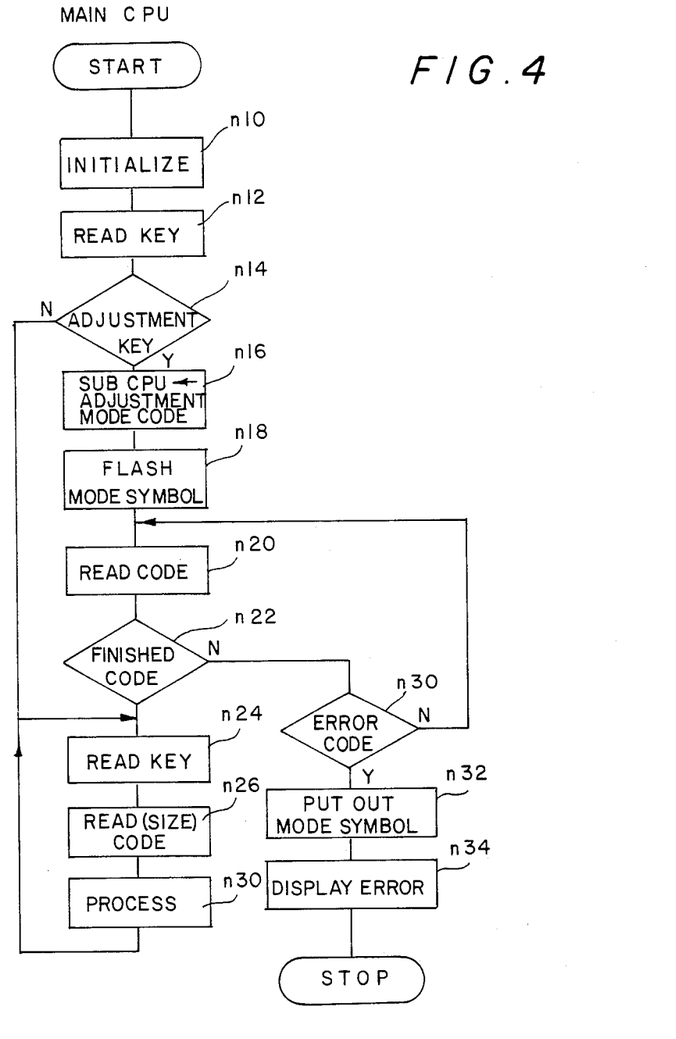
FIG. 4 is a flowchart showing steps of processing in the main CPU shown in FIG. 1.
Figure 5:
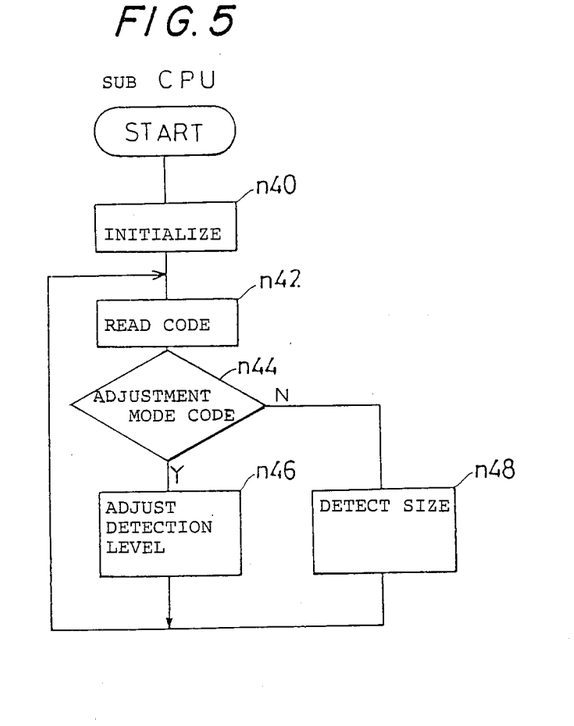
FIG. 5 is a flowchart showing steps of processing in the sub CPU shown in FIG. 1.

FIG. 4 is a flowchart showing steps of processing in the main CPU and FIG. 5 is a flowchart showing steps of processing in the sub CPU.

(i) Processes in the Main CPU

The main CPU, as shown in FIG. 4, first initializes every portion when the power source is turned on and reads the key-entered input (n10→n12). This operation of reading the key entered input is a process for reading the key operation already made upon turning on of the power supply. If, it is detected that the adjustment key has been operated, the main CPU outputs a control code to the sub CPU 6 so that it may turn to the adjustment mode and makes the symbol flash indicating that it is now in the adjustment mode (n14→n16→n18). Then, the same reads a code output from the sub CPU 6 and detects whether the code is a FINISHED code or not (n20→n22). As described later, when the sub CPU 6 when has finished the adjustment of the detection levels of all the sensors, the FINISHED code indicating that the adjustment has been finished is output to the main CPU 10. The main CPU waits for this output code to be output from the sub CPU 6. Thereafter, the same performs ordinary processing, that is, reading of the key entry, reading of the original size, and processing according to these data (n24→n26→n28). Here, the reading of the original size in the step n26 is performed by reading the code representing the original size output at the Port C of the sub CPU. By the way, when the sub CPU 6 is in the adjustment mode, if the code read from the sub CPU 6 is an error code, the symbol indicating the adjustment mode is turned off and a corresponding error display is put on the display (n30→n32→n34).

(ii) Processing in the Sub CPU

The sub CPU after the power source is turned on, as shown in FIG. 5, make initialization and reads a code output from the main CPU (n40→n42). If the read code is the control code for the sub CPU to turn to the above described adjustment mode, it makes the later discussed adjustments of the detection levels of each of the sensors (n44→n46). If not, it makes the ordinary original size detection (n48).

(iii) Adjustment of Detection Levels

Figure 6:
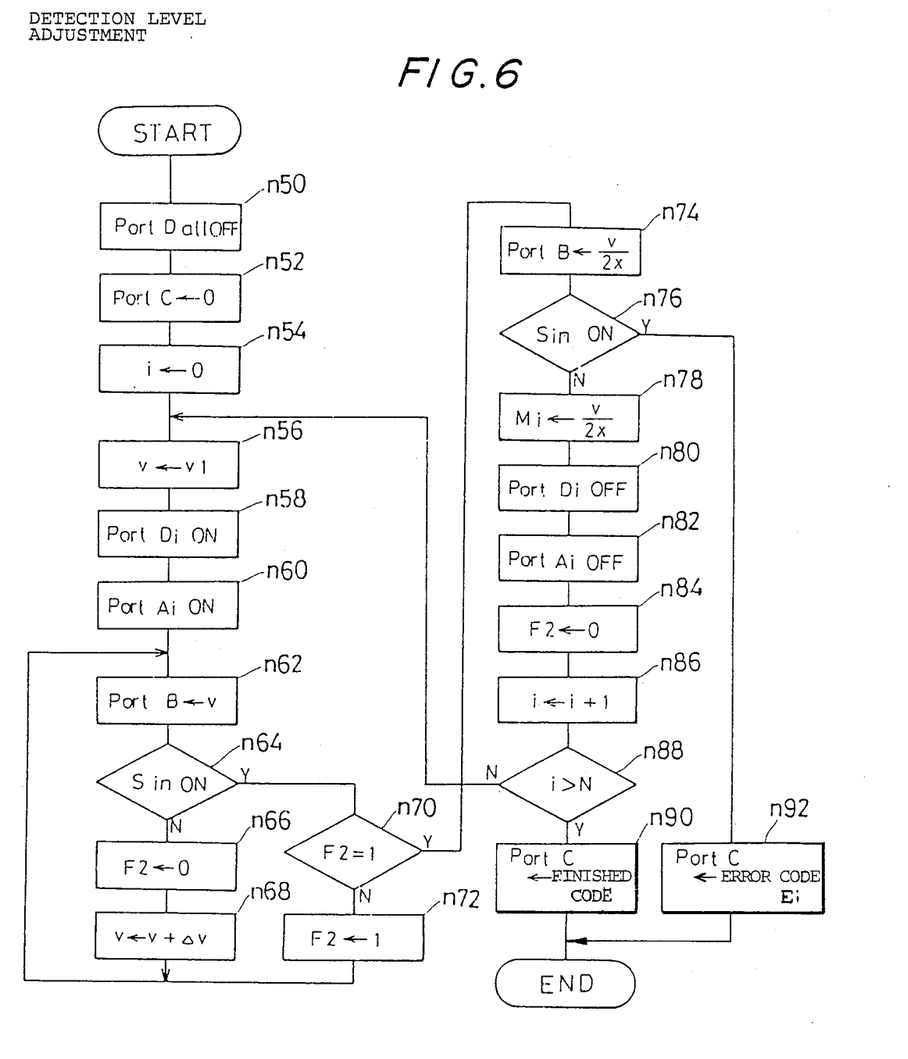
FIG. 6 is a flowchart showing steps of detection level adjustments for each sensor corresponding to the step n46 in FIG 5.

FIG. 6 is a flowchart showing the steps of adjustments of the detection levels of each of the sensors as indicated in the step n46 of FIG. 5. The process in this mode is executed without an original mounted on the original table and with the original cover opened. To begin with, the Port D is entirely turned off. That is, all the terminals in the Port D are turned to "L" level, and thereby, the light emitting diodes $LD_0$–$LD_N$ are all put out. Then, the Port C is reset and a pointer i is reset (N52→n54).

Then, an initial value v1 is set in a memory v representing the reference voltage of the comparator, both the Port $P_0$ and the Port $A_0$ are selected, and the reference voltage corresponding to the contents of the memory v is output to the Port B (n56→n58→n60→n62). The light emitting diode $LD_0$ is then lighted and the photodiode $PD_0$ receives the light therefrom and applies its voltage to the inverting input terminal of the comparator 9. Meanwhile, the voltage v1 as the reference voltage for the comparator 9 is applied to the noninverting input terminal thereof. Here, the voltage value v1 is determined depending on the light quantity of the light emitting diode LD, the output of the photodiode PD, the reflection factor of the reflecting plate 5, the transmission factor of the original table 1, etc. and is sufficiently smaller than the value allowing the output of the comparator to become "H" level. After that, the same detects the level of the Sin terminal. Since the output of the comparator 9 then is at "L" level, a flag F2 is reset and the reference voltage v to be applied to the comparator 9 is set to a higher voltage by $\Delta v$ and the voltage is output to the Port B (n66→n68→n62).

The reference voltage is gradually increased in the described manner, and when the output of the comparator 9 turns to "H" level, the flag F2 is set and it is confirmed once again with the same reference voltage applied (n64→n70→n72→n62). If the terminal of the Sin is also in the ON state for the second time, namely, the output of the comparator is at "H" level, a voltage equal to the reference voltage at that time multiplied by (1/2x) is output from the port B and the state of the Sin is detected (n74→n76).

The above mentioned above-mentioned reference voltage v is, so to call it, the threshold value of the detection level of the sensor formed of the light emitting diode $LD_0$ and photodiode $PD_0$, and v/2x is the reference voltage which is actually used when the output of the sensor is detected by the comparator. Here x is the multiplier in the reference voltage as the threshold value to allow the output of the comparator to become "H" level in the case where an original of the highest transmission factor of the originals to be copied, such as that of OHP or tracing paper, is mounted on the original table. Thus, when the detection is made according to the detection level of the sensor of whether there is an original or not, the reference voltage to be applied to the comparator is set to the virtually intermediate value v/2x between the reference voltage v corresponding to the detection level of the sensor and the reference voltage v/x at the time when the original of the highest transmission factor of the originals to be copied is detected to be present. Against the reference voltage established as described above, if it is confirmed that the output of the comparator 9 is at "L" level, then the value corresponding to the reference voltage at this time is stored in the i-th (the 0-th, in the present case) memory Mi (n76→n78). This memory M corresponds to a specific area in the RAM 12 of the main CPU. Therefore, the processing in the step n78 is executed by the delivery of the data to the main CPU through the Port c.

Thereafter, the Port Di ($D_0$, in the present case) is turned to "L" level and the Port Ai ($A_0$, in the present case) is provided with "H" impedance (n80→n82). Further, the flag F2 is reset, and the pointer 1 is incremented by 1, and thus, similar steps are taken for the second sensor (n84→n86→n88→n56).

After the reference voltage levels that are to be applied to the comparator at the time of the original size detection for all the sensors have been stored in the memories $M_0$–$M_N$, a FINISHED code is output to the Port C. By the way, if ON is detected in the step n76, the sensor is regarded as defective and an error code is output to the Port C (n76→n92).

Figure 7:
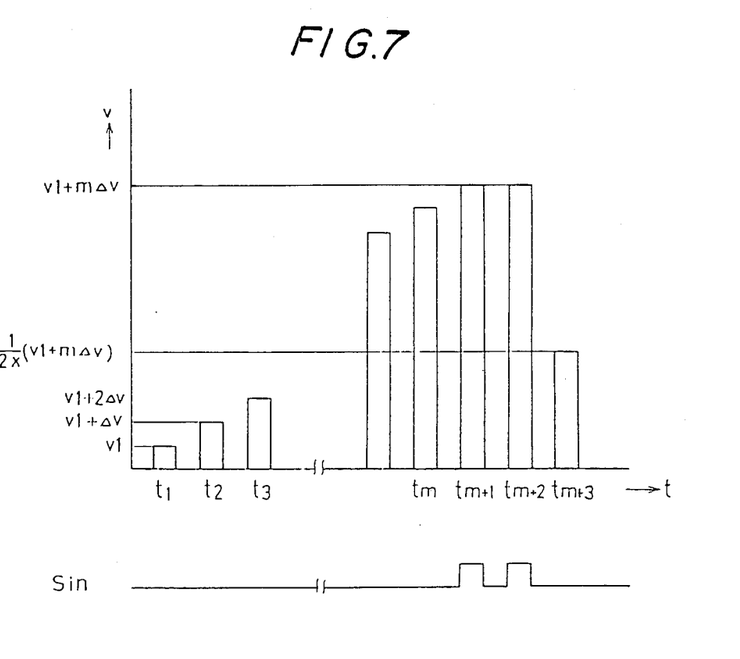
FIG. 7 is a chart showing signals in points shown in FIG. 1 during the above-mentioned adjustments.

FIG. 7 is a diagram showing the relation between the reference voltage levels and the input terminal Sin of the sub CPU at the time of the above described adjustment of the detection level.

(iv) Detection of the Original Size

Figure 8:
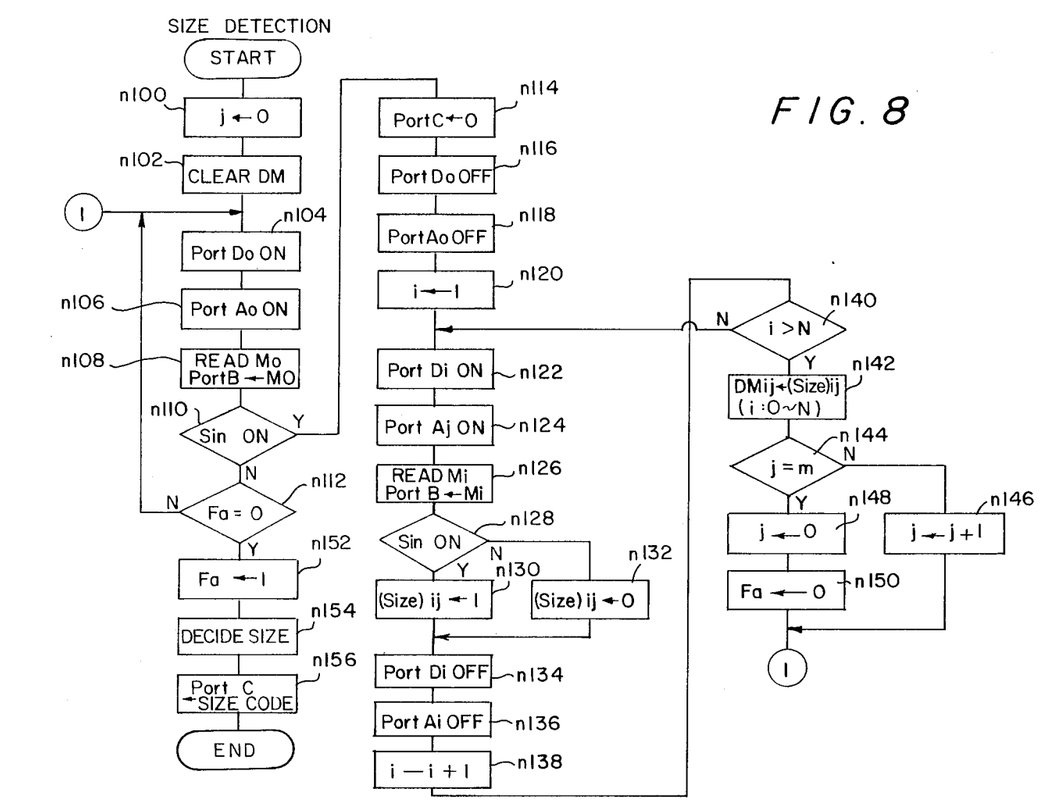
FIG. 8 is a flowchart showing the steps of processing for the size detection corresponding to the step n48 in FIG. 5.

After the setting of the reference levels to be output to the comparator have been made based on the detection levels of each of the sensors stored in the memory of the sub CPU 6 as described above, detection of the original size is executed. FIG. 8 is a flowchart describing the sequence of detecting the original size, and it corresponds to the step n48 in FIG. 5. First, a pointer j is reset and a memory DM is cleared (n100→n102). This memory DM is the memory for storing the results of the later discussed detection to be conducted m times for each sensor.

Then, the port $D_0$ and the port $A_0$ are brought to "H" level thereby to drive the light emitting diode $LD_0$ and the photodiode $PD_0$, and in the meantime, the detection level $M_0$ for the sensor made up of the light emitting diode $LD_0$ and the photodiode $PD_0$ stored as described above is read out from the memory and the corresponding reference voltage is output to the Port B (n104→n106→n108). Under these conditions, it is detected whether the input terminal Sin is in "ON" state ("H" level), and if it is not at "H" level, these steps are repeated until it is brought to "H" level (n110→n112→n104).

At this time, a flag FA is in the reset state. The sensor made up of $LD_0$ and $PD_0$ is for detecting the opened or closed state of the original cover, and the Sin is brought to "ON" state when the original cover is opened. If the "ON" state is detected, the Port C is reset, and the Port $D_0$ is turned to "L" level and the Port $A_0$ is provided with "H" impedance. Then, an initial value 1 is input to the pointer i, and the Port Di and the Port Ai corresponding to the value indicated by the pointer i are brought to "H" level, and the detection level corresponding to the i-th sensor is read out from the memory and the corresponding reference voltage is output to the Port B (n122→n124→n126). Under this condition, the state of the input terminal Sin is detected, and if it is at "H" level, a bit (size) ij indicated by the pointer i and the pointer j in the memory is set, and if it is at "L" level, the same is reset. Then, the Port Di is turned to "L" level and the Port Ai is provided with "H" impedance (n134→n136).

Thus, the pointer i is provided with increments by ones and similar steps are taken for all the sensors and the states of document detection of each of the sensors are obtained for storage in the memory (size) ij (n138→n140→n122). The thus obtained detection states of each of the sensors are temporarily saved in the memory DM, and similar steps are repeated until the pointer j, provided with an increment by one at every repetition, reaches m (n142→n144→n146→①→n104). That is, after an original is mounted on the original table and before the original cover is closed, detections of each sensor are repeated m times and the results are stored in the memory DM. Thus, the m times of detections are repeated before the original cover is closed (n144→n148→n150→①→n104).

Then, after the original cover is closed, since the decision in the step n110 is NO, the original size is decided depending on the detected states of each of the sensors already stored in the memory DM (n110→n112→n152→n154). The detection of the size is carried out in such a manner that the most probable and reasonable decision is made from the results of detections of each of the sensors conducted m times. And the thus obtained size of the original is put out to the Port C as the code of the original size.

Figure 9:
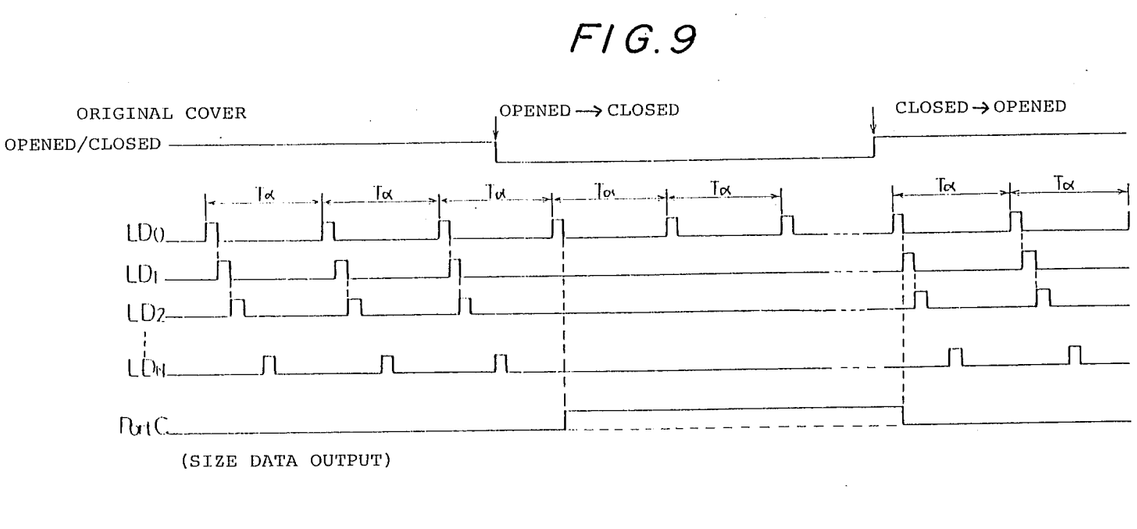
FIG. 9 is a timing chart in the above-mentioned processing.

As shown in the timing chart of FIG. 9, detections as to whether or not there is an original are repeated by the detection levels corresponding to each of the sensors including the light emitting diode $LD_1$ to $LD_N$ at the period of $T\alpha$ while the original cover 2 is opened, and the detected data are thus stored or update the data previously stored.

(d) Other Embodiments

The above-described embodiment has been such that the reference voltage to be applied to the comparator is gradually increased and the reference voltage which inverts the output voltage of the comparator is temporarily stored in a memory and, by multiplying a predetermined constant to this value, the reference voltage to be applied to the comparator at the time of actual detection of the original size is established. If the reference voltage for the comparator has previously been arranged such that it will change as a function of time, then the time from when the reference level for the comparator has been changed to when the output of the comparator is inverted can be obtained, and the reference voltage to be applied to the comparator in the actual original size detection can be established based on the aboove obtained time.

Figure 10:
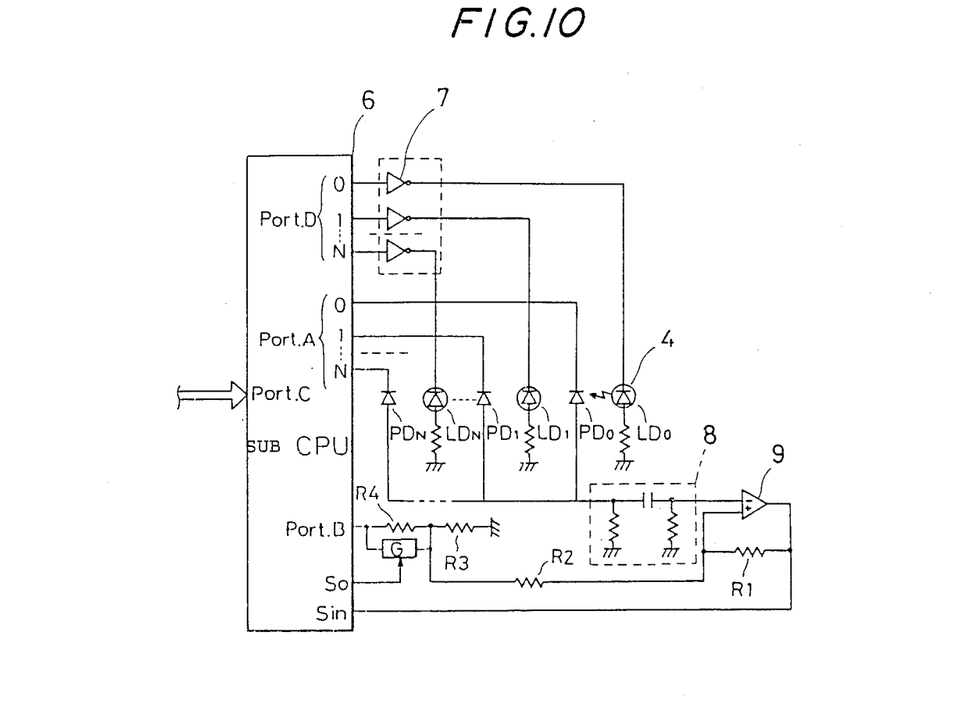
FIG. 10 is a diagram showing a portion of the circuit of the document size detection apparatus as another embodiment of the present invention.

FIG. 10 is a drawing showing the portions different from the circuit diagram of FIG. 1. Although the sub CPU outputs a voltage on the analogue basis from the Port B the same as in the previous embodiment, the voltage is divided by resistors R4 and R3 and applied to the comparator 9 as the reference voltage. The voltage dividing ratio by the resistors R4 and R3 is 1/2x. The gate G is connected in parallel with the resistor R4 and serves to short the resistor 4 by a signal from an output terminal $S_0$ of the sub CPU.

Figure 11:
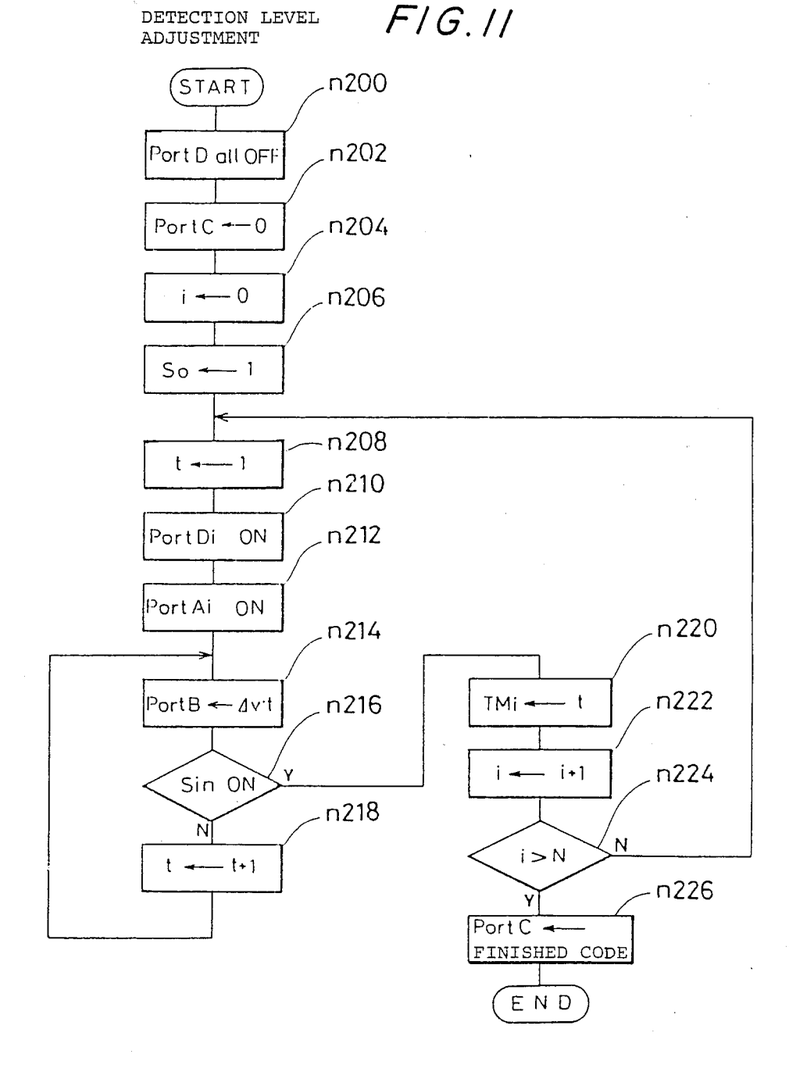
FIG. 11 is a flowchart showing the steps of processing in the sub CPU in FIG. 10.

FIG. 11 is a flowchart describing the sequence of the detection level adjustment in the adjustment mode executed by the sub CPU. Firstly, the Port D is entirely turned OFF, whereby all the light emitting diodes $LD_0$ to $LD_N$ are brought to an out state. Then, the Port C is reset and the pointer i is reset. Thereafter, "H" level is output from the output terminal $S_0$ so that the gate G is rendered conductive. Then, an initial value 1 is established in a timer t and the Port Di and the port Ai designated by the pointer i are turned ON. That is, the i-th light emitting diode and photodiode are selected and the voltage corresponding to a minimum unit voltage $\Delta v$ multiplied by the value of the timer t is output from the Port B (n214). Then, the state of the output of the comparator is detected until the same is brought to "H" level with the timer provided with increments, and these steps are repeated (n216→n218→n214). If the terminal of Sin is brought to an ON state, that is, the output of the comparator is brought to "H" level, the value of the timer at that time is stored in a memory TM (n220). These steps are taken for all the sensor portions (n222→n224→n208). Thereafter, an output command is delivered from the Port C and the process is finished.

When the document size of an original or the like is detected based on the time data coorresponding to each of the sensor portions stored in the memory TM, the output terminal $S_0$ of the sub CPU is turned to the "L" level at first and the voltage to be applied to the comparator is made to be the divided voltage value, 1/2x, by the resistors R4 and R3 as shown in FIG. 10. Therefore, in the original size detection mode, the reference level meeting the purpose is provided by arranging the voltage corresponding to the value stored in the memory TM multiplied by $\Delta v$ to be output from the Port B. As described above, when the change in the reference level for the comparator has been predetermined as a function of the time in the adjustment mode, the time from when the reference level of the comparator has been started to change to when the output of the comparator has been inverted is obtained and, based on the data corresponding to the thus obtained time, the reference voltage to be applied to the comparator in the detection mode can be established.

The above-described embodiments have illustrated the case where the automatic adjustment of the detection level for each sensor is made according to the key operation made at the time the power supply has been turned on, but such arrangements are also possible that the adjustments will always be made when the power supply is turned on or the adjustments of the detection level of each of the sensors will be automatically made when the number of copied sheets has reached a predetermined number.

By the above-described arrangement, the reference levels to be applied to the comparator for the comparison in the original size detection mode can be optimized for each of the sensor portions, and thereby, the adverse effects due to nonuniformity of characteristics of the light emitting devices and photodetector devices of the sensor portions, inequality of characteristics of the circuits to drive the sensors, or the like can be eliminated.

Also, since the threshold values of each of the sensor are obtainable automatically in the adjustment mode without mounting a document on the original table, the need for manual adjustment is eliminated. And, even if the original table or the light emitting devices and photodetector devices have become dirty or the sensor portions have suffered changes in the electrical characteristics, the adjustments can be automatically performed at any time when necessary. Further, as volume controls for adjustment are necessary the circuit can be made simpler.

While only certain embodiments of the present invention have been described, it will be apparent to those skilled in the art that various changes and modifications may be made therein without departing from the spirit and scope of the present invention as claimed.

What is claimed is:

1. A document size detection apparatus having a plurality of sensor portions including light emitting devices and photodetector devices disposed in the vicinity of an original table for detecting the size of a document mounted on the original table by means of reflected light or transmitted light, a comparator for comparing the output level of said sensor portion with a reference level, and decision means for determining the document size depending on the output signal of the comparator, said document size detection apparatus comprising:
- means for changing the reference level for said comparator and for detecting the resultant output of the comparator;
- means for finding the condition in which the reference level becomes equal to the output level of said sensor portion;
- storage means for storing the value representing that condition, which are used in the adjustment mode without a document mounted on said original table; and
- reference level setting means for setting the reference level to be input to said comparator depending on the value stored in said storage means, which is used in the document size decision mode for detecting the size of a document mounted on said table.

2. The document size detection apparatus according to claim 1, wherein the value to be stored in said storage means is the reference level equalized to the output level of said sensor portion.

3. The document size detection apparatus according to claim 1, wherein the value to be stored in said storage means is the time from when the reference level beings to change to when the reference level becomes equal to the output level of said sensor portion.

4. The document size detection apparatus according to claim 1, wherein said sensor portion is formed of a plurality of sensors, said means for finding the condition in which said reference level becomes equal to the output of said sensor portion finds the condition in which these levels become equal for each sensor, said storage means stores said value for each sensor, and said reference level setting means sets said reference level for each sensor.

* * * * *